United States Patent [19]
Roberts

[11] Patent Number: 5,548,998
[45] Date of Patent: *Aug. 27, 1996

[54] GAS METER HAVING SELECTIVITY CHARGEABLE COVERS

[75] Inventor: John A. Roberts, Camberley, England

[73] Assignee: Smith Meters Limited, London, England

[*] Notice: The term of this patent shall not extend beyond the expiration date of Pat. No. 5,515,722.

[21] Appl. No.: 373,229

[22] PCT Filed: Jun. 30, 1993

[86] PCT No.: PCT/GB93/01366

§ 371 Date: Feb. 17, 1995

§ 102(e) Date: Feb. 17, 1995

[87] PCT Pub. No.: WO94/01742

PCT Pub. Date: Jan. 20, 1994

[30] Foreign Application Priority Data

Jul. 14, 1992 [GB] United Kingdom .................. 9214876
Mar. 18, 1993 [GB] United Kingdom .................. 9305591

[51] Int. Cl.⁶ ................................................. G01F 3/20
[52] U.S. Cl. ................................................. 73/263; 73/264
[58] Field of Search ......................... 73/861, 861.47, 73/262, 263, 264, 268, 269, 703, 715, 716

[56] References Cited

U.S. PATENT DOCUMENTS

| | | | |
|---|---|---|---|
| 1,804,596 | 5/1931 | Dickinson | 73/262 |
| 2,619,940 | 12/1952 | Leroy | 73/263 |
| 3,808,886 | 5/1974 | Goldsberry | 73/264 |
| 4,091,668 | 5/1978 | Namikawa et al. | 73/263 |
| 4,593,562 | 6/1986 | Carte et al. | 73/266 |

*Primary Examiner*—Richard Chilcot
*Assistant Examiner*—Max Noori
*Attorney, Agent, or Firm*—Bacon & Thomas

[57] ABSTRACT

A gas meter, including flexible diaphragms which shift within chambers into which the gas to be metered is alternately admitted and exhausted, is adapted for a variety of different mounting configurations by the selection of appropriate top and bottom covers. In one embodiment, each of the top and bottom covers includes a gas pipe connection with these connections being arranged parallel to each other. In a second embodiment, the top cover is internally divided to provide separate paths for inlet and outlet gases while the bottom cover constitutes a blank plate.

5 Claims, 5 Drawing Sheets

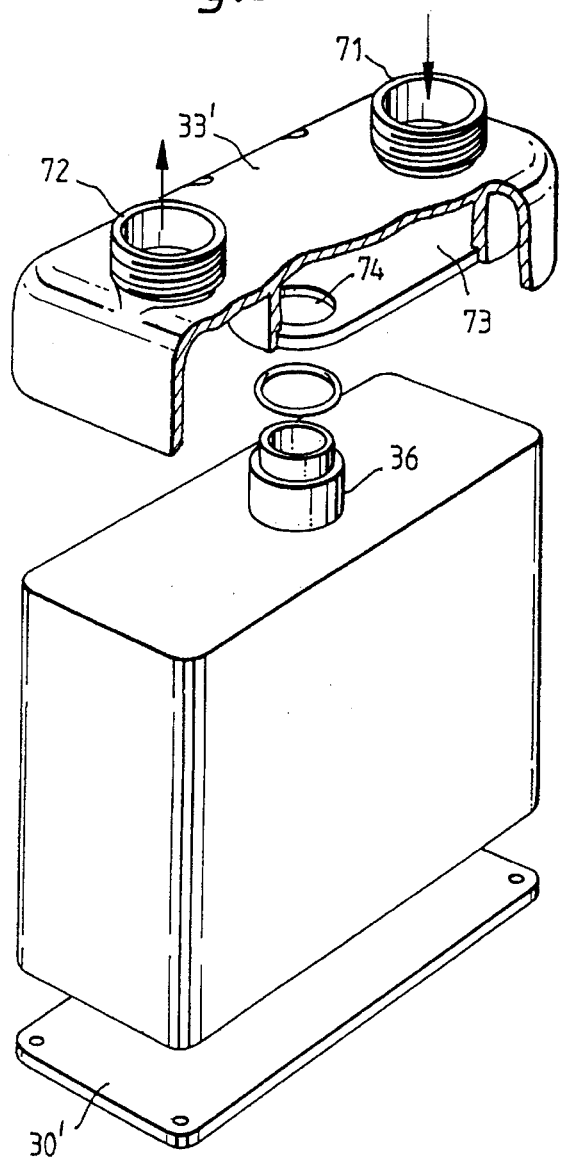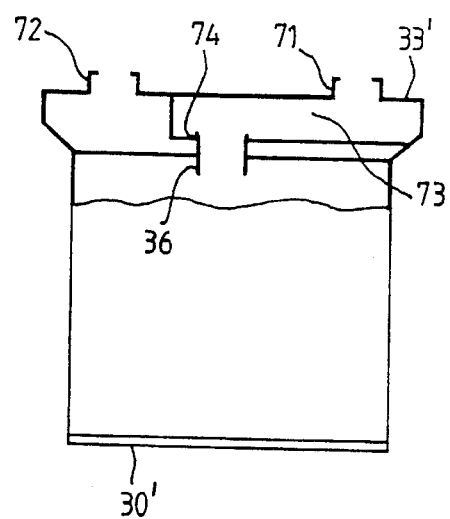

5,548,998

GAS METER HAVING SELECTIVITY CHARGEABLE COVERS

BACKGROUND OF THE INVENTION

1. Field of the Invention

This invention relates to a dry gas meter of the kind in which flexible diaphragms work back-and-forth in chambers to which the gas being metered is alternately admitted and exhausted. It is desired that meters of the kind described should be made adaptable to different mounting configurations, so that they may be used to replace meters in existing installations.

2. Discussion of the Prior Art

Gas meters are known, for example from DE-C-733288, DE-A-1473042, CH-A-298931, FR-A-1317938 and GB-A-819765, which are adaptable to different configurations. This is normally done by having alternative top covers, each with an inlet and outlet with the inlet and outlet having different configurations. These meters are not adapted to be inserted in a vertical pipe system without excessive pipe bends since they have no facility for inletting gas to the bottom of the meter.

The present invention provides a dry gas meter of the kind in which flexible diaphragms work back and forth in first and second chambers to which the gas being metered is alternately admitted and exhausted, the meter having covers providing inlet and outlet connections for connecting the meter into a gas line and by their configuration determining the path taken by gas flowing through the meter, the meter having a core defining at least parts of the first and second chambers which are located at opposite sides of the meter and a third chamber at the top of the meter, the third chamber accommodating valves and valve drive gear associated with the first and second chambers, characterised in that the core is provided in one piece and additionally defines a fourth chamber at the bottom of the meter and defines internal gasways connecting the third and fourth chambers, and in that in one configuration the covers comprise first and second covers respectively closing the third and fourth chambers and each defining an inlet/outlet connection, which inlet/outlet connections are parallel with one another, and in another configuration the covers comprise third and fourth covers, the third cover closing the third chamber and defining two inlet/outlet connections spaced apart from one another and for connection to two spaced parallel pipes and the fourth cover closing the fourth chamber and having no inlet/outlet connection.

By selecting appropriate first and second covers the meter may in a first mode be adapted for an in-line vertical gas flow from an inlet boss in the lower cover to an outlet boss in the upper cover. In this adaptation, the outlet boss is connected to an exhaust tube connected to the first and second chambers and the inlet boss directs gas flow into the fourth chamber, through the internal gasways and into the said third chamber.

By the simple provision of appropriate upper and lower covers the meter can be adapted to meet a variety of different connection configurations, so that it can be used for vertical in-line connections and for replacement of meters having horizontally spaced-apart connections. It should be noted that the majority of the meter is not affected by such adaptation so that virtually the same design of meter can be used for a number of different applications simply by the use of appropriate covers.

The invention extends to the provision of a meter which can by the selection of simple and appropriate covers be adapted to different connection configurations. It also extends to the provision of a meter having interchangeable covers which affect the direction of gas flow through the meter.

BRIEF DESCRIPTION OF THE DRAWINGS

A specific embodiment of the invention is shown in the accompanying drawings, in which:

FIG. 5 is an exploded perspective view of the upper end of the gas meter of FIG. 1 in a second mode, and FIG. 6 is a diagram showing another arrangement and the parts needed for adaptation to the second mode.

DETAILED DESCRIPTION OF THE PREFERRED EMBODIMENTS

Figure 1:
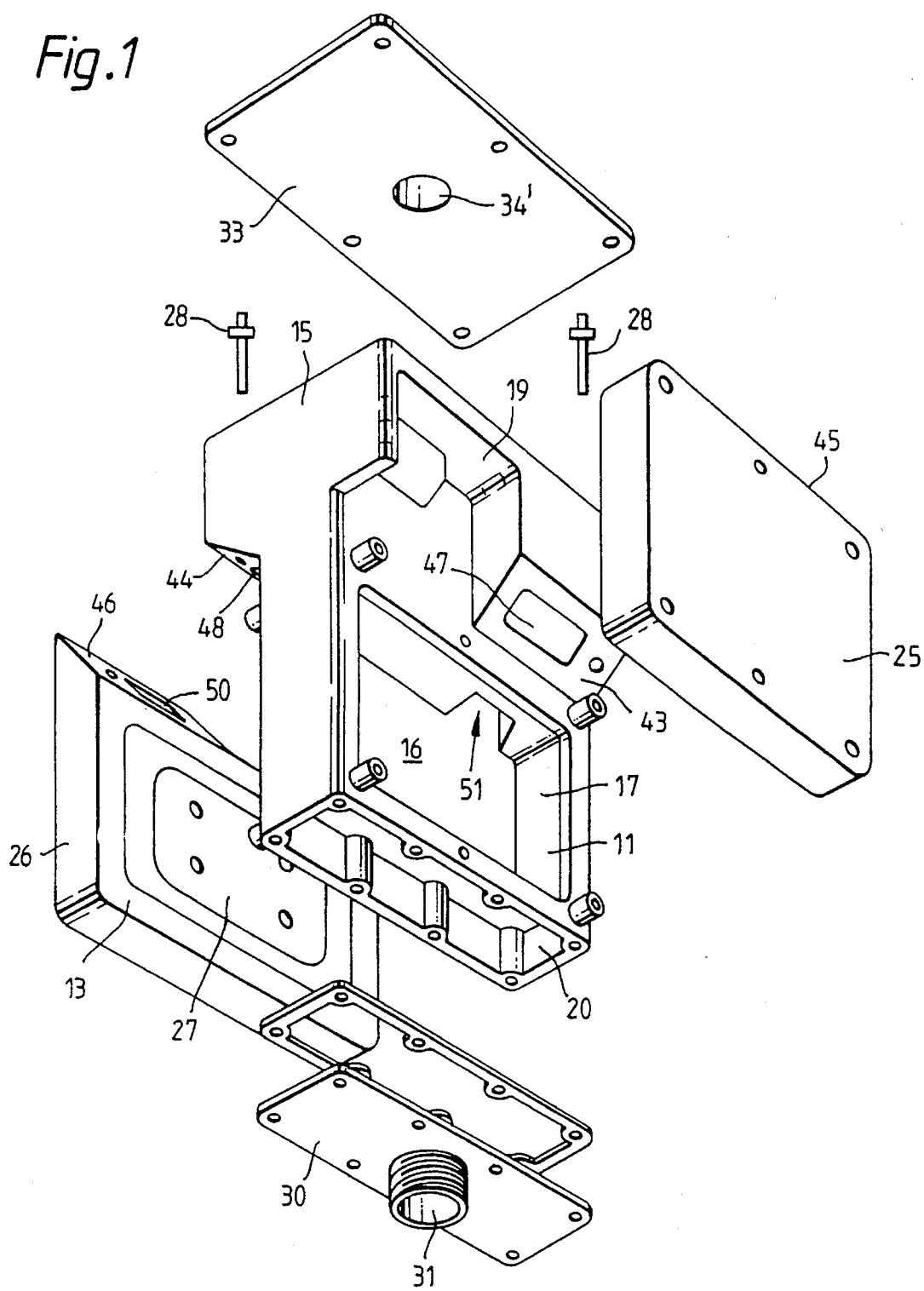
FIG. 1 is an exploded perspective view of the main components of a gas meter.

The gas meter comprises two chambers (11, 12) each divided vertically by a flexible diaphragm (13) so that gas being measured may be alternately admitted and exhausted from either side of the diaphragm, causing it to oscillate back-and-forth. As is usual, the oscillations of the diaphragm are counted to provide a measure of the volume of gas which has passed through the meter.

As seen best in FIG. 1, the meter body depends on a unitary core (15) which is an aluminium die casting providing structure for the meter casing, inner gas chamber, valve gear container, index housing and gasways, as described hereinafter in more detail. The core comprises a central vertical partition (16) comprising one side of each of the chambers (11, 12), and two angled walls (17) either side of the partitions, each forming the dished shape of a chamber. The upper end of the core forms a recess (19) opening to the side which is the index housing, and an irregular housing (23) opening to the top which houses valves, valve drive gear, and index drive means.

Figure 3:
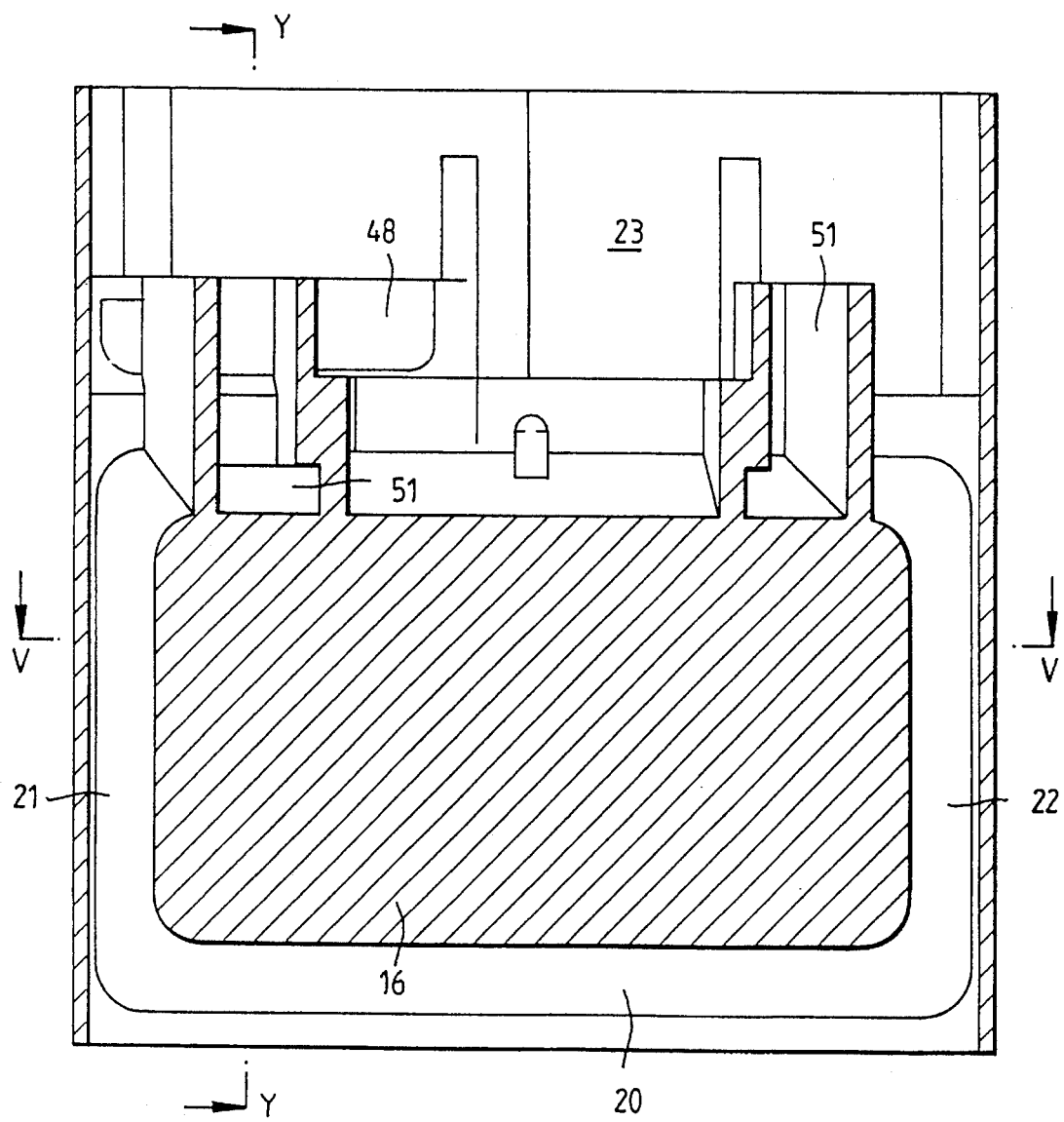
FIG. 3 is a vertical section through a central unitary part of the meter of FIG. 1.

The lower end of the core forms a housing/chamber (20) across the core connecting at each side with vertically-extending triangular-section gas inlet ways (21, 22) [FIG. 3].

Figure 4:
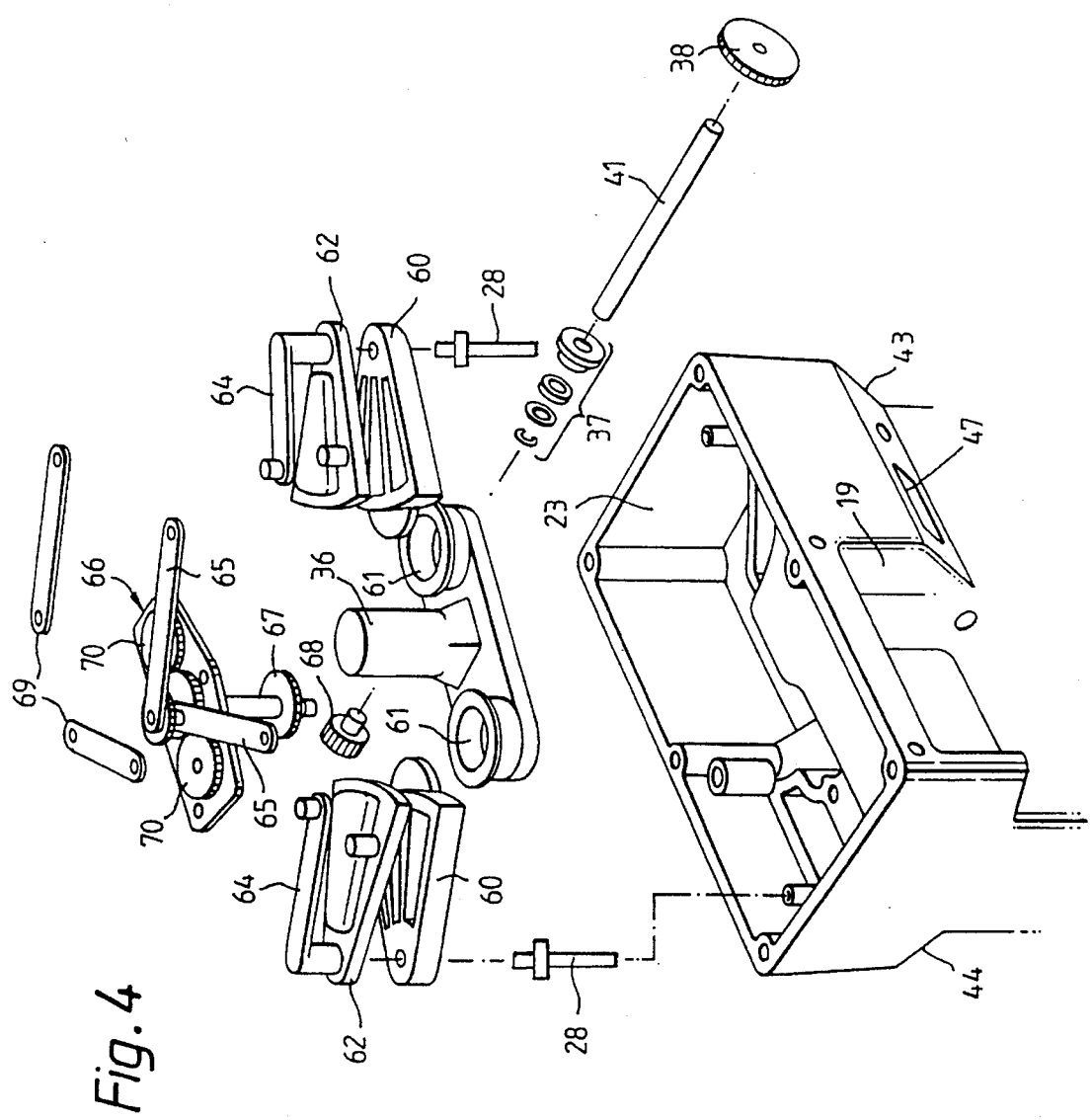
FIG. 4 is an exploded perspective view from the upper end the gas meter of FIG. 1, showing the interior parts.

The two chambers (11, 12) are completed by similar cast aluminum outer pans (25,26) [FIG. 1], each having a diaphragm (13), although only one is seen due to the angle of viewing of pan 25. Both pans are secured to the core (15). Each diaphragm has a central disc (27) secured by a flag arm to a flag (28) [FIG. 4] extending into housing (23) to drive the valve drive gear and index drive means.

In a first mode of operation, the lower housing (20) is closed by a cast aluminium lower cover (30) having a central bossed gas inlet (31) which communicates with housing (20) and gasways (21, 22). The upper housing (23) is closed by a cast aluminium upper cover (33) having a central bossed gas outlet (34') [FIG. 2] which communicates with an exhaust tube (36) [FIG. 4] in housing (23).

Figure 2:
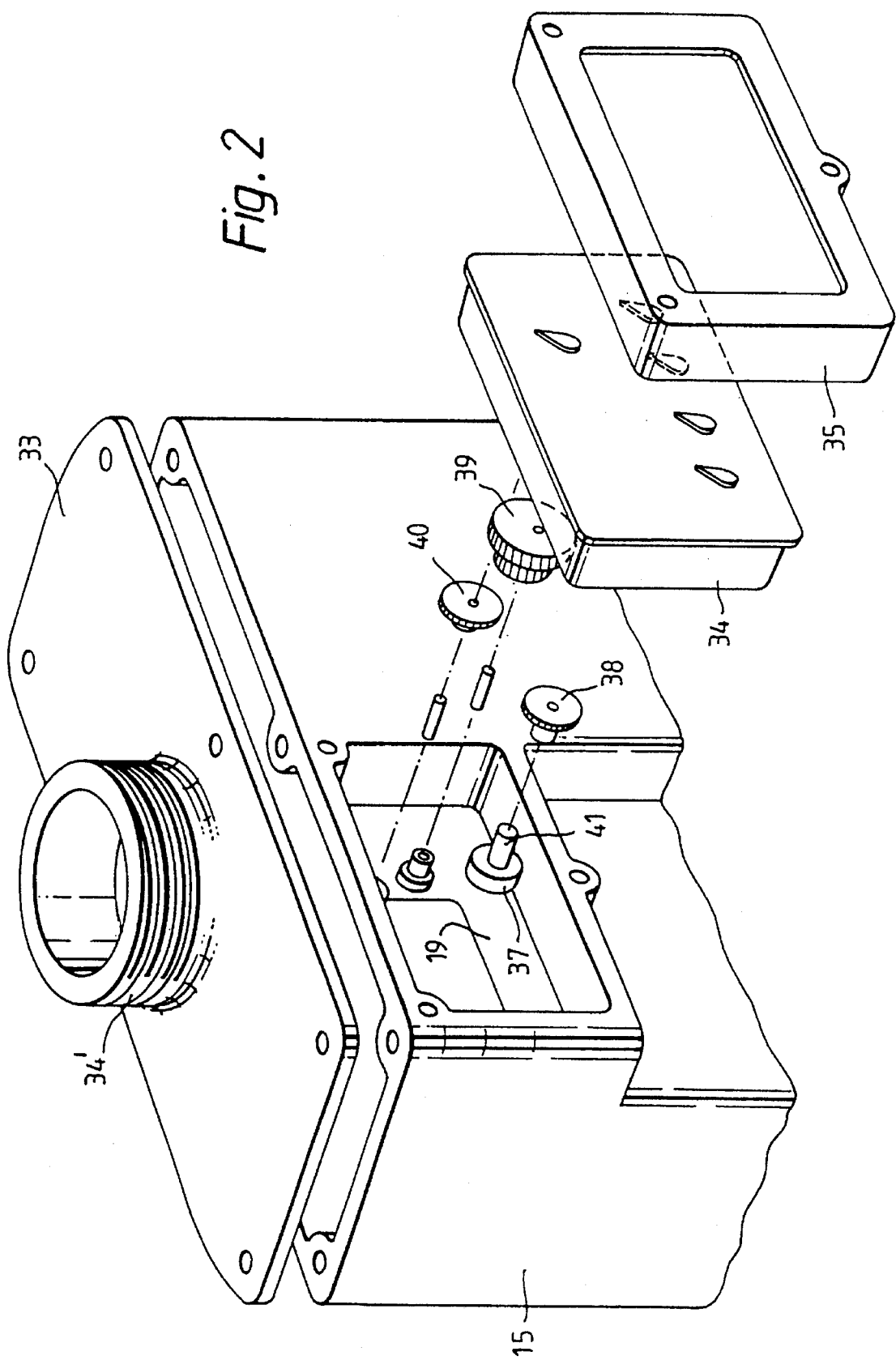
FIG. 2 is an exploded perspective view of the upper part of the meter in FIG. 1, in one mode.

The index housing (19), as best seen in FIG. 2, houses an index assembly (34) and a cover (35) having a viewing plate through which the meter reading can be read. A sealed bush bearing (37) in the rear wall of the housing allows a lay shaft (41) [also seen in FIG. 4] passage to drive an output gear (38) and through it change gear (39) and index drive gear (40), which operates the index assembly (34) to count the oscillations of the diaphragms.

Adjacent each outer pan (25, 26), the core (15) has an angled face (43, 44) which mates with a similarly angled face (45, 46) on the corresponding outer pan. Gasways (47, 48) connect through openings (50) into the interior of the pans on the outer side of diaphragms (13).

On the inner side of the diaphragms (13) the core provides gasways (51), also connected to the interior of the chambers (11, 12).

Gasways (51, 48, 47) all extend up through the core and through a lower wall of the upper housing (23) ending in the same plane as seen best in FIG. 3. Exhaust tube (36) [FIG. 4] is forked to provide a pair of entrances (61) and the tube is mounted so that these lie in the same plane as the entries no gasways (51, 48, 47). A valve grating (60) for each chamber (11, 12) covers the two gasways to either side of the diaphragm and one of the exhaust tube entrances (61). Inlet gasways (21) and (22) open into the upper housing (23) so that it is at all times filled with the gas being metered. An oscillating valve cover (62) for each valve grating alternately admits gas from housing (23) to either side of the diaphragm and exhausts it from the chambers into exhaust tube (36) and out of outlet (34'). Thus the flowing gas is forced to move the diaphragms back-and-forth and oscillate flags (28). Flags (28) drive top arms (64) which are connected to cranks (65) to rotate a gearbox (66). Gear (67) driven by the gearbox connects with output gear (68) which rotates layshaft (41) which, as discussed above, drives the index.

Cover drive arms (69) are driven from gears (70) of the gearbox and connected to the valve covers (62) to oscillate them as described above.

In this first mode of operation as described above, the gas enters at the bottom of the meter and exits at the top so that the meter can readily be mounted in-line. However, it is frequently desired to replace existing meters which have traditionally been connected to two spaced apart connections on the top surface of the meter.

It has been found that the meter may be adapted into a second mode of operation in which it may be used as a replacement meter by only changing two components, the lower cover (30) and the upper cover (33).

In both FIG. 5 and FIG. 6, the two replacement components comprise a new lower cover (30') and a new upper cover (33'). The lower cover (30') simply blanks off the bottom of the meter so that gas-ways (21, 22) are closed at the bottom. Upper cover (33') is a complex aluminium casting providing an outlet boss (71) and an inlet boss (72), the distance between these bosses being equal to the traditional connection arrangement so that the meter can be attached to existing connections. Boss (71) leads into a chamber (73) having an opening (74) located to engage and seal onto the exhaust tube (36) [FIG. 4]. Boss (72) leads directly into the housing (23) from which gas enters the chambers (11, 12). In the arrangement of FIG. 6, the distance between the bosses (71, 72) is so great that the upper cover (33') has to have a greater width than the width of the meter itself, because the meter is smaller than previous designs.

It will he appreciated that the major working part of the meter is standard and unchanged, so that a single design can be used for a number of different connection requirements, with only minimum and simple refitting.

It will be noted that the meter design is distinguished by a particularly efficient use of space so that the overall size is kept to a minimum. The two pan covers (25) and (26) fit neatly against the core, their outer surfaces being flush with the outer surfaces of the upper pan of the core.

Since the pan covers, the top cover and the lower cover are all rigid aluminium castings, the core and its covers are all of strong and durable enough construction to need no outer casing for protection, this also contributing in major part to the reduced size of the meter.

The assembly of the meter is also very much simplified by the use of the unitary core. In assembly, the pan covers and diaphragm and flag structures are separately put together and then secured to the core. The lower cover is secured in position, thus determining the gas flow direction. The valves and drive gear are assembled in housing (23) and the upper cover secured over the top. The index is then assembled and attached into the index housing. No casing operations as such are required, the unitary core, pan covers and upper and lower covers together forming the outer surfaces of the meter. The selection of the upper and letter covers determines the connection configuration of the meter, without any other alteration to the meter.

I claim:

1. A dry gas meter having a one piece core defining at least parts of first and second chambers located on opposite sides of the meter, a third chamber located at a top of the meter and a fourth chamber located at a bottom of the meter, two flexible diaphragms located respectively in the first and second chambers and each arranged to work back and forth in its associated chamber to/from which the gas being metered is alternately admitted and exhausted, valves and valve drive gear located in the third chamber and arranged to direct gas to and from the first and second chambers, the cores additionally defining internal gasways connecting the third and fourth chambers, and first and second covers respectively closing the third and fourth chambers and each defining an inlet/outlet connection for connection respectively into a gas line, which connections extend parallel to one another.

2. A dry gas meter having a one piece core defining at least parts of first and second chambers located on opposite sides of the meter, a third chamber located at a top of the meter and a fourth chamber located at a bottom of the meter, two flexible diaphragms located respectively in the first and second chambers and each arranged to work back and forth in its associated chamber to/from which the gas being metered is alternately admitted and exhausted, valves and valve drive gear located in the third chamber and arranged to direct gas to and from the first and second chambers, the core additionally defining internal gasways connecting the third and fourth chambers, a third cover closing the third chamber and defining parallel inlet and outlet connections spaced apart from one another and for connection to two spaced inlet and outlet pipes respectively, and a fourth cover closing the fourth chamber and having no inlet/outlet connections.

3. A meter according to claim 1 wherein the inlet/outlet connections of the first and second covers are coaxial with one another and located substantially centrally of the top and bottom of the meter.

4. A meter according to claim 2 wherein the third cover has a major dimension in one direction which is greater than the dimension of the rest of the meter in the same direction, the inlet/outlet connections being located adjacent outer ends of the major dimension of this cover.

5. A meter according to claim 2 in which the third cover has an outlet connection which leads into a fifth chamber having an opening located to engage and seal into an exhaust outlet from the first and second chambers, and the inlet connection leads directly into the third chamber.

* * * * *